Aug. 20, 1963   J. J. WOCHNER   3,101,138
CABLE CONTROL UNIT
Filed April 17, 1961   2 Sheets-Sheet 1

Inventor
Joseph J. Wochner
By Charles C. Schuh
Attorney

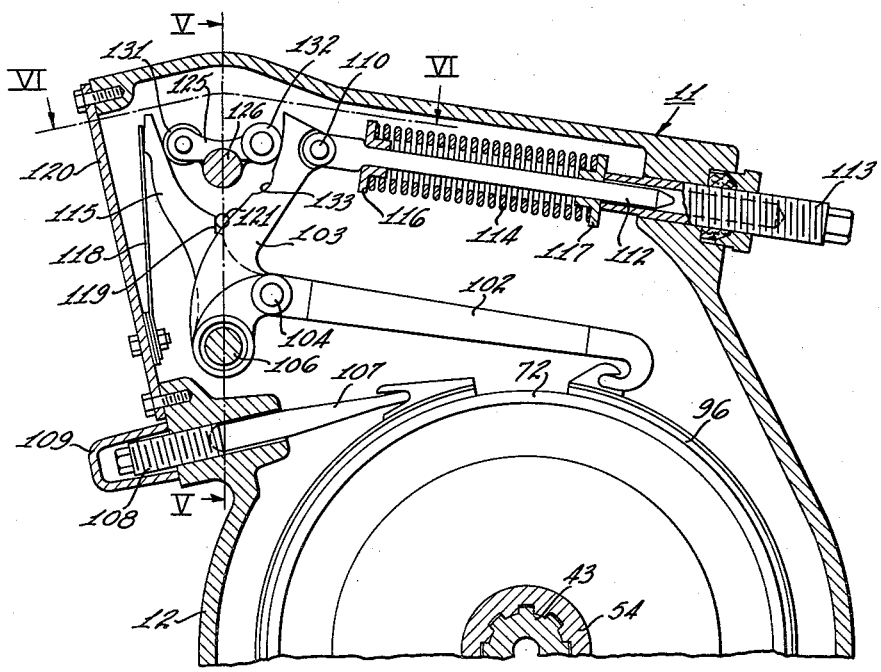
Fig. 4
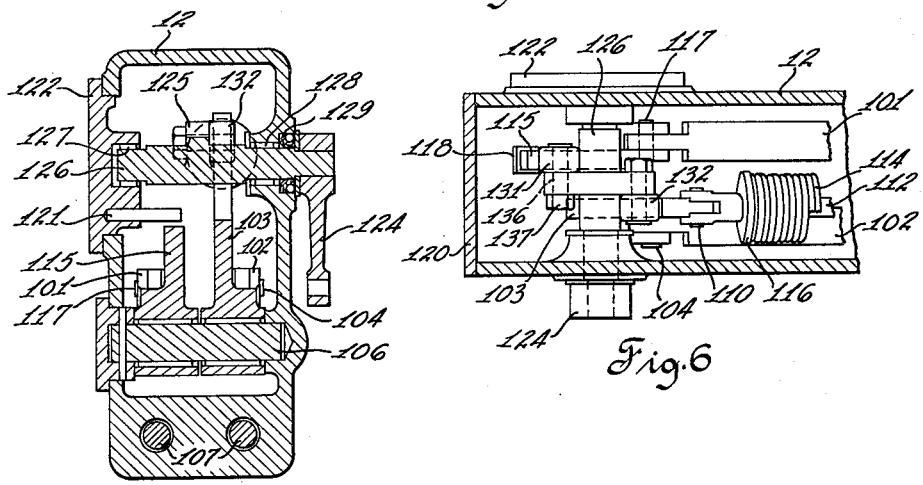
Fig. 5
Fig. 6
Inventor
Joseph J. Wochner
By Charles C. Schwab
Attorney 3,101,138
Patented Aug. 20, 1963

3,101,138
CABLE CONTROL UNIT
Joseph J. Wochner, Springfield, Ill., assignor to Allis-Chalmers Manufacturing Company, Milwaukee, Wis.
Filed Apr. 17, 1961, Ser. No. 103,456
14 Claims. (Cl. 192—4)

This invention relates to a cable control unit of the type including countershaft gearing, a holding brake, and a drive establishing means for establishing and disconnecting power to the cable drum.

It is an object of this invention to provide a cable control unit wherein a countershaft gear train, holding brake and drive establishing means are contained within a single housing.

It is a further object of this invention to provide a cable control unit of the type hereinbefore described and including control means for the brake and drive establishing means, which controls are also disposed within the housing so as to be lubricated by the same lubricating fluid utilized to lubricate the drive establishing means, brake and bearings for the countershaft gear train.

It is a further object of this invention to provide a compact cable control unit with spaced parallel input and output shafts wherein the housing of the control unit contains a brake drum secured to a gear mounted on the axis of the input shaft which is in radially overlapping relation to the output gear secured to the output shaft and wherein the output shaft is supported entirely by one wall of the housing.

It is a further object of this invention to provide a compact cable control unit wherein the gearing, brake, drive establishing means and controls therefor are enclosed within a single housing and are splash lubricated by lubricating fluid contained in the housing.

It is a further object of this invention to provide a compact cable control unit wherein the cable drum, output shaft and output gear are a unitary rotating member supported on a first axis in a single wall of the control unit housing, and to provide epicyclic gearing and brake drums within the housing on a second axis and disposed axially between the output gear and the opposite wall of the housing in radially overlapping relation to the output gear.

It is a further object of this invention to provide a cable control unit wherein the power transmitting gearing and controls therefor are sealed in a single housing and wherein the output shaft carrying the cable control drum also includes an output gear and such shaft is supported by a pair of bearings which are lubricated by lubricating fluid in the housing.

These and other objects and advantages of this invention will be apparent from reading the following description in conjunction with the drawings in which:

FIG. 4 is a section taken along the line IV—IV of FIG. 3;

FIG. 5 is a section taken along the line V—V of FIG. 4; and

FIG. 6 is a section taken along the line VI—VI of FIG. 4.

Figure 1:
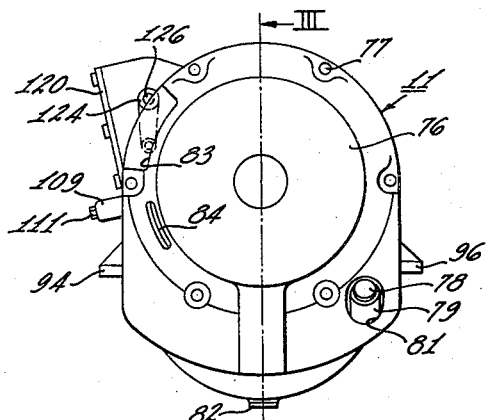
FIG. 1 is an end view of a cable control unit of this invention.
Figure 2:
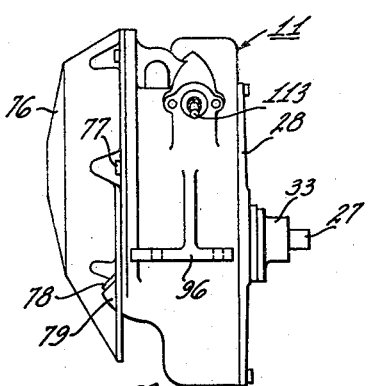
FIG. 2 is a side view of the cable control unit shown in FIG. 1.
Figure 3:
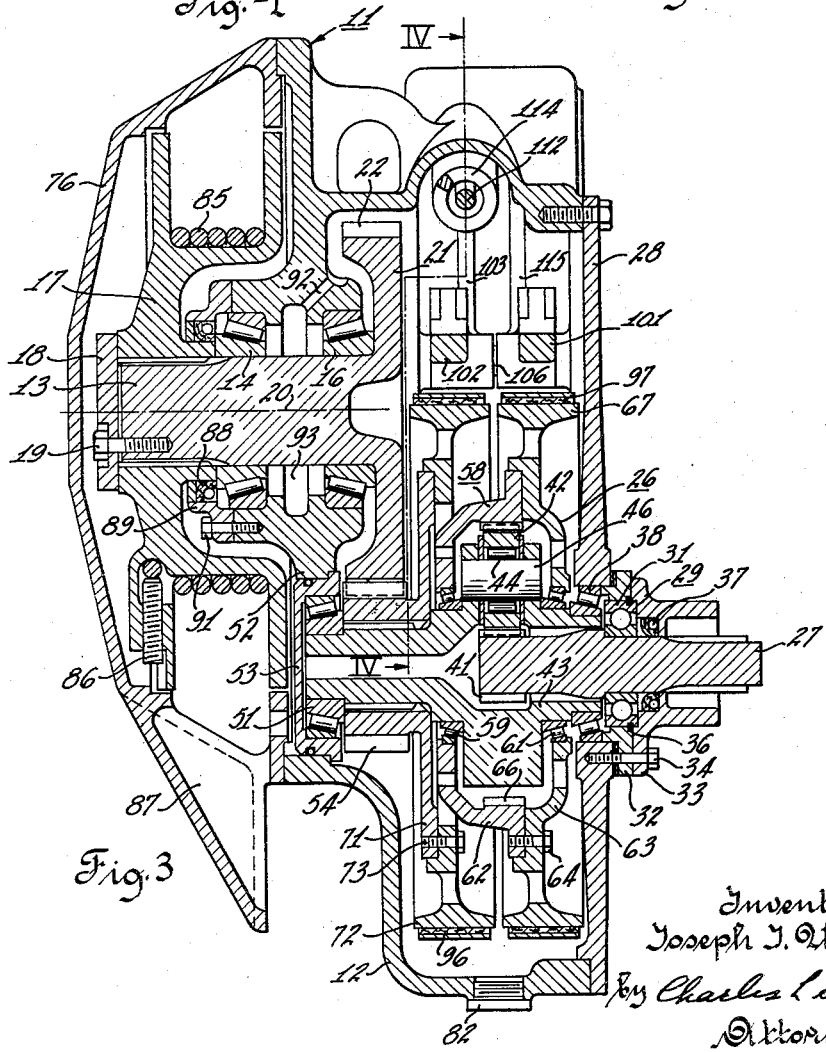
FIG. 3 is a section taken along the lines III—III of FIG. 1.

Referring to FIGS. 1, 2 and 3, the cable control unit 11 has a housing 12 containing a countershaft gear train. The countershaft gear train includes an output shaft 13 which is carried by a pair of axially spaced tapered bearings 14, 16. A cable drum 17 has an internally splined hub portion in cooperative engagement with a splined end of the output shaft 13. The cable drum 17 is secured against axial movement by a drum retaining washer 18 secured to the shaft by a plurality of cap screws 19. The drum retaining washer 18 also serves to retain bearings 14 and 16 in their proper position through the abutting relation of the hub portion of a cable drum 17 with the inner raceway of the bearing 14 and the axial thrust relationship between the inner raceway of the bearing 16 and the gear 21 formed on the inner terminal end of shaft 13. Gear 21 presents external spur gear teeth 22.

From the foregoing it is seen that the shaft 13, gear 21 and drum 17 can be considered a unitary output member rotatably mounted in a vertical wall of the housing on a first axis 20.

Epicyclic gearing 26 is interposed between the output gear 21 and an input shaft 27. The input shaft 27 is mounted on a main housing cover 28 forming a vertical wall of the housing 12, by a ball bearing 29. The outer raceway 31 of bearing 29 is maintained in position by a pair of bearing retainers 32, 33 which are secured to the cover 28 by a plurality of cap screws 34. The outer raceway 31 of bearing 29 is maintained in position by the snap ring 36 interposed between the two bearing retainers 32, 33. Retainer 33 also houses an oil seal 37 exteriorly of the bearing 29 for sealing the input shaft 27 relative to cover 28. The retainer 32 besides serving to position bearing 29 also serves to axially position a taper roller bearing 38.

A sun gear 41 is connected to the input shaft for rotation in unison therewith by virtue of its being integrally formed on the inner end of the input shaft 27. The sun gear 41 meshes with a plurality of planet gears 42 rotatably mounted on a planet gear carrier 43. Each planet gear is carried on a planet gear shaft 46 by a roller bearing 44.

The epicyclic gearing is rotatably supported within the housing by the two vertical axially spaced walls thereof through the carrier 43 being supported by taper bearings 38, 51, the latter of which is mounted in vertical wall 52 of the main housing by a retainer 53.

Output power is taken from the epicyclic gearing through a gear 54 having a splined connection with the carrier 43. Gear 54 is in constant mesh with output gear 21. Since gear 54 is smaller than gear 21 a speed reduction is attained. A ring gear 58 is rotatably carried on the carrier by a pair of taper roller bearings 59, 61, the ring gear 58 is composed of two parts 62, 63 secured together by a plurality of cap screws 64. Part 62 has internal ring gear teeth 66 formed integral therewith which mesh with the teeth of planet gears 42. Part 63 has a brake drum 67 formed integrally thereon. When the brake drum 67 is held against rotation, power is transmitted from the input shaft 27 to the cable drum 17. Gear 54 has a radially extending flange 71 to which a holding brake drum 72 is secured by plurality of cap screws 73.

The epicyclic gearing is employed in the power control unit as a means for establishing and interrupting power to the cable drum 17 by holding the ring gear element against rotation by the brake on the ring gear and by releasing the brake, respectively. Thus the epicyclic gearing serves not only as a speed reducer but also as a drive establishing means.

A protective cable drum cover 76 is secured to the housing 12 by cap screws 77. A filling plug 78 is screwed into a threaded opening in a boss 79 protruding through an opening 81 in cover 76. A drain plug 82 is provided at the bottom of housing 12. The cable passes onto and off the cable drum 17 through an opening 83 in the cover 76. An opening 84 is provided in the cover 76 to permit a cable retaining screw 86 to be adjusted against the end of the cable 85 reeved about drum 17.

Any debris that may find its way inside the cover is permitted to fall out through the bottom of the cover 76 through a bottom opening passage 87. An oil seal 88, on the exterior side of bearing 14, is interposed between an inwardly projecting flange of the cable drum 17 and a seal retainer 89. Retainer 89 is secured to the wall 52 of the housing 12 by a plurality of cap screws 91.

The cable control unit may be filled to the level of filling plug 78 with lubricating oil and at this level there is sufficient splashing by the gearing and centrifugal slinging by the brake drums to insure oil being thrown against the controls at the upper portion of the housing which will later be described. Some of the oil splashed against the top of the housing 12 will run through a passage 92 in wall 52 to the cavity 93 between bearings 14 and 16. Thus lubricating fluid in housing 12 lubricates all the gears and bearings for the power train as well as the brakes and controls therefor within the housing. A pair of mounting flanges 94, 96 are provided on the housing 12 for securing the cable control unit to a tractor or other unit.

Referring now also to FIGS. 4, 5, and 6, the controls for operating the band assemblies 96, 97 operatively disposed around the holding brake drum 72 and the brake drum 67 will now be described. The band assemblies 96, 97 are identical. Identical control links 101, 102 have claws at their free end engaging complementary claws on the bands. Link 102 is pivotally connected to a holding brake lever 103 by a pivot pin 104. The holding brake lever 103 is pivotally connected to a brake lever shaft 106. A brake band adjusting link 107 is provided for each of the band assemblies 96, 97. The band adjustment link 107 is positioned by a band adjusting screw 108 in threaded engagement with housing 12. The band adjusting screws 108 for the links 107 are disposed within a cover 109 secured to the housing by a cap screw 111 shown in FIG. 1. The upper end of the holding brake lever 103 is pivotally connected to a rod 112 by a pin 110. The free end of rod 112 is disposed within a hollow end of an adjusting screw 113. A holding brake spring 114 surrounds rod 112 and is interposed between washers 116, 117 at opposite ends thereof which react against the rod 112 and adjusting screw 113, respectively. Thus it is seen that the control linkage for brake band 96 includes a link 102, a lever 103 and a spring 114 biasing the linkage toward a band tightening position.

Link assembly 101 is pivotally connected to a brake lever 115 by pin 117. The brake lever 115 is biased in a clockwise direction as viewed in FIG. 4 by a leaf spring 118 to the position illustrated in FIG. 4 wherein an abutment surface 119 of the brake lever is in abutting relation to an abutment pin 121 secured to a brake operating shaft cover 122. Leaf spring 118 is secured to an inspection cover plate 120 which in turn is secured to the housing 12. The brake operating shaft cover 122 is secured to the housing 12 by suitable means, such as cap screws, not shown. In the condition of the brake lever 115 shown in FIG. 4 the band 97 about brake drum 67 is not tightened and therefore no power is being transmitted to the cable drum 17. As illustrated in FIG. 4 the band 96 is tightened on holding brake drum 72 thereby preventing the cable from reeving off the drum.

A single operating lever 124 controls the cable control unit through its camming engagement with brake control lever 103 and control lever 115. Lever 124 is secured to an operating member 126 which in turn has one end journaled in the cover 122 by needle bearings 127. The other end of member 126 is journaled in the housing 12 by needle bearings 128. An oil seal 129 is provided between the housing 12 and the rotatable member 126. Operating member 126 has a flange 125 extending radially therefrom which carries a pair of brake operating shaft followers 131, 132 in the form of rollers 131, 132. Follower 131 is in abutting relation to the lever 115 and the follower 132 is in abutting relation to holding brake lever 103. A notch 133 is provided in the holding brake lever 103 to provide a detent for follower 132. Roller 131 is secured to flange 125 by a bolt 136 and nut 137. Roller 132 is similarly connected to flange 125. When operating lever 124 is rotated clockwise as viewed in FIGS. 1 and 3, the member 126 will swing roller 132 clockwise into the notch 133 and in such position the holding brake band 96 is released. Roller 131 swings upwardly releasing band 97 of the brake for ring gear 58. Thus any load on the cable 85 attached to the drum 17 would be lowered in such clockwise position of operating lever 124. When the lever 124 and member 126 are rotated counterclockwise, the roller 131 will cam the brake lever 115 counterclockwise about pivot pin 106 sufficiently to tighten the brake band 97 thereby braking the ring gear 66 of the epicyclic gearing. This results in power being transmitted to gear 21 of shaft 13 thereby rotating the drum 17. The holding brake in this power actuated or drive establishing position of the operating lever 124 will be in engagement and the power transmitted to the gear 54 forces the brake drum 72 to rotate in a clockwise direction as viewed in FIG. 4 overcoming the tension of spring 114. Thus the holding brake is engaged when the drum 17 is rotated to prevent dropping the load supported by the cable 85 should the band 97 be released or in case of failure of the power train to gear 54.

From the foregoing description, it is apparent that the operating lever 124 has three operating positions. In the first position which is shown in FIG. 4 the brake on ring gear 58 is disengaged but the holding brake is holding the cable drum 17 against movement. When operating member 126 is rotated clockwise from the position shown in FIG. 4, the brakes are both released and the drum is free to rotate. When the lever 124 is rotated counterclockwise as viewed in FIGS. 1 and 4 from the position therein shown, the brake on ring gear 58 will be engaged and the brake on gear 54 will be in engagement but slipping by virtue of drum 72 being driven in a clockwise direction, against the tension of spring 114, by power from the input shaft 27.

From the foregoing description, it is obvious that I have disclosed a novel cable control unit which is very compact.

By mounting the output shaft 13 carrying drum 17 and output gear 21 in a single side wall 52 of the housing, the shaft 13 requires no more space in the housing than is necessary for its supporting bearing 14, 16 and its gear 21. Thus a substantial axial space is available between the gear 21 and wall 28 of housing 12 by virtue of my supporting the shaft 13 entirely on wall 52. This axial space is put to good use by installing therein the epicyclic gearing, brakes and controls for the brakes. By placing the holding brake on the carrier of the epicyclic gearing, which is the effect of the structure illustrated, less frictional force is required to prevent rotation of cable drum 17 than would be required if the brake were placed on gear 21. The holding brake, which includes drum 72 and band 96, may be smaller and its service life will be greater than a holding brake acting on the output shaft 13. Besides being a compact cable control unit my unit has all its parts requiring lubrication, sealed in a single housing. Only two oil seals 37, 88 are required between the housing and the gear train transmitting power through the housing 12 to the cable drum 17. The bearings for the gearing, the brake bands and controls for the brake and epicyclic gearing are lubricated by the oil contained in the housing 12 by splash lubrication. Also it should be noted that the brakes are directly associated with the epicyclic gearing forming the first gear reduction rather than with the output shaft which is considered the second gear reduction.

Although a single embodiment of this invention has been described and illustrated it is not intended to limit the invention except as necessitated by the scope of the appended claims.

What is claimed is:

1. A cable control unit comprising: an enclosed housing having a pair of spaced walls, a cable drum on the outside of said housing, an output shaft nonrotatably secured to said drum and having a portion extending through one of said walls into the interior of said housing, bearing means supporting said output shaft and drum in said one wall for rotation relative thereto on a first axis, a first gear coaxially and nonrotatably secured to said portion of said output shaft, an input shaft rotatably supported in said other wall of said housing on a second axis parallel to said first axis and having an end disposed within said housing, a second gear rotatably mounted within said housing on said second axis in constant meshing relation with said first gear, a friction brake within said housing on said second gear and means within said housing for selectively establishing and interrupting the transmission of power between said input shaft and said second gear.

2. A cable control unit comprising: a sealed housing having a pair of spaced exterior walls; a cable drum on the outside of said housing, an output shaft nonrotatably secured to said drum and having a portion extending through one of said walls into the interior of said housing, bearing means supporting said output shaft in said one wall for rotation relative thereto on a first axis, a first gear coaxially and nonrotatably secured to said portion of said output shaft, an input shaft rotatably supported on said other wall of said housing on a second axis parallel to said first axis and having an end disposed within said housing, a second gear rotatably mounted within said housing on said second axis in constant meshing relation with said first gear, a friction brake within said housing on said second gear, drive establishing means within said housing operatively associated with said input shaft and said second gear for selectively establishing and interrupting the transmission of power between said input shaft and said second gear, and lubricant within said housing for lubricating said gears, bearing means, brake and drive establishing means.

3. The structure set forth in claim 2 and further comprising controls operatively connected to said brake and drive establishing means, said controls being mounted on and disposed within said housing and lubricated by said lubricant.

4. A cable control unit comprising: a housing having a pair of spaced exterior walls, a cable drum on the outside of said housing, an output shaft nonrotatably secured to said drum and having a portion extending through one of said walls and terminating in the interior of said housing, a first gear coaxially and nonrotatably secured to said portion of said output shaft in adjacent relation to said one wall, bearing means mounted in said one wall rotatably supporting said output shaft intermediate said drum and first gear on a first axis, an input shaft rotatably supported in said housing on a second axis parallel to said first axis and having a part extending through the other of said walls into said housing, a second gear rotatably mounted within said housing on said second axis in constant meshing relation with said first gear, friction brake means disposed within said housing for selectively braking said second gear, and means within said housing interposed between said input shaft and said second gear for selectively establishing and interrupting power transmission between said input shaft and said second gear.

5. A cable control unit comprising: a housing having a pair of spaced exterior walls, a cable drum on the outside of said housing, an output shaft secured to said drum for rotation therewith and having a portion extending through one of said walls into the interior of said housing, a first gear secured coaxially with said portion of said output shaft for rotation therewith and disposed in adjacent relation to said one wall, a pair of bearings mounted in said one wall in axially spaced relation to one another and rotatably supporting said output shaft intermediate said drum and first gear on a first axis, an input shaft having a part extending through the other of said walls into said housing, bearing means between said other wall and said input shaft for rotatably supporting the latter on a second axis parallel to said first axis, a second gear rotatably mounted within said housing on said second axis in constant meshing relation with said first gear, friction brake means disposed within said housing for selectively braking said second gear, drive establishing means within said housing operatively associated with said input shaft and said second gear for selectively establishing and interrupting power transmission between said input shaft and said second gear, lubricating fluid in said housing in contact with rotating portions of said drive establishing and brake means, a fluid seal between said input shaft and said other wall of said housing exteriorly of said bearing means, and a fluid seal between said output shaft and said one wall exteriorly of said pair of bearings, all of said gears, bearings, bearing means, drive establishing and brake means being splash lubricated by said lubricating fluid.

6. A cable control unit comprising: an enclosed housing having a pair of spaced walls, a cable drum on the outside of said housing, an output shaft secured to said drum for rotation therewith and having a portion extending through one of said walls into the interior of said housing, bearing means supporting said output shaft and drum in said one wall for rotation relative thereto on a first axis, a first gear secured coaxially to said portion of said output shaft for rotation therewith, an input shaft rotatably supported in said other wall of said housing on a second axis parallel to said first axis and having an end disposed within said housing, a second gear rotatably mounted within said housing on said second axis in constant meshing relation with said first gear, a friction holding brake within said housing on said second gear, epicyclic gearing rotatably supported within said housing including a sun gear element, a ring gear element, a carrier element and planet gears, a first of said elements being connected for rotation with said input shaft, a second of said elements being connected for rotation with said second gear, and a friction brake within said housing on the third of said elements operative upon engagement thereof to stop rotation of said third element relative to said housing.

7. A cable control unit comprising: a housing having a pair of spaced exterior walls, a cable drum on the outside of said housing, an output shaft secured to said drum for rotation therewith and having a portion extending through one of said walls into the interior of said housing, a first gear secured coaxially to said portion of said output shaft to rotate in unison therewith, a pair of bearings mounted in said one wall in axially spaced relation to one another and rotatably supporting said output shaft intermediate said drum and first gear on a first axis, an input shaft having a part extending through the other of said walls into said housing, bearing means between said other wall and said input shaft for rotatably supporting the latter on a second axis parallel to said first axis, a second gear rotatably mounted within said housing on said second axis in constant meshing relation with said first gear, a band type brake drum secured to said second gear for rotation therewith, a brake band on said drum, means for tightening said brake band to frictionally engage said drum to resist rotation thereof including a brake control linkage and spring biasing said linkage toward a band tightened position, drive establishing means within said housing for selectively establishing and interrupting power transmission between said input shaft and said second gear, control means for operating said drive establishing means including a control lever rotatably mounted in said housing, a rotatable operating member engaging said linkage and control lever and having a portion extending outside of said housing, lubricating fluid in the lower portion of said housing in contact with said brake drum, said gears, bearings, bearing means, drive establishing means, brake control linkage, control means and operating member being splash lubricated by said lubricating fluid.

8. A cable control unit comprising: a housing having a pair of spaced exterior walls, a cable drum on the outside of said housing, an output shaft coaxially secured to said drum for rotation therewith and having a portion extending through one of said walls into the interior of said housing, a first gear coaxially secured to said portion of said output shaft for rotation in unison therewith, a pair of bearings mounted in said one wall in axially spaced relation to one another and rotatably supporting said output shaft intermediate said drum and first gear on a first axis, an input shaft having a part extending through the other of said walls into said housing, bearing means between said other wall and said input shaft for rotatably supporting the latter on a second axis parallel to said first axis, a second gear rotatably mounted within said housing on said second axis in constant meshing relation with said first gear, a first brake drum secured to said second gear for rotation therewith, a first brake band on said first drum, a first control linkage connected to said first band, a spring biasing said linkage toward a band tightened position, epicyclic gearing within said housing including carrier, ring and sun elements, a first of said elements being connected to rotate with said input shaft and a second of said elements being connected to rotate with said second gear, a second brake drum secured to the third of said elements, a second brake band on said second brake drum, a second control linkage connected to said second band, a rotatable operating member engaging said linkages to selectively tighten and loosen said bands and having a portion extending outside of said housing, lubricating fluid in the lower portion of said housing in contact with portions of said brake drums, said gears, epicyclic gearing, bearings, bearing means, brake bands, control linkages, and control member being splash lubricated by said lubricating fluid.

9. A cable control unit comprising: a housing having a pair of parallel exterior walls, a cable drum on the outside of said housing, an output shaft secured to said drum for rotation therewith and having a portion extending through one of said walls and terminating in the interior of said housing, a first gear coaxially secured to said portion of said output shaft for rotation therewith and disposed adjacent said one wall, a pair of bearings mounted in said one wall in axially spaced relation to one another and rotatably supporting said output shaft intermediate said drum and first gear on a first axis, said drum and first gear being supported entirely by said one wall, an input shaft rotatably supported relative to said housing on a second axis parallel to said first axis and having a part extending through the other of said walls into said housing, a second gear rotatably mounted within said housing on said second axis in constant meshing relation with said first gear, a brake drum on said second gear disposed axially between said first gear and said other wall and in radially overlapping relation to said first gear, and means operatively associated with said input shaft and said second gear within said housing for selectively establishing and interrupting power transmission between said input shaft and said second gear.

10. The structure set forth in claim 9 wherein said means includes a drum rotatably mounted within said housing on said second axis in radially overlapping relation to said first gear and disposed axially between said brake drum on said second gear and said other wall.

11. A cable control unit comprising: a first rotating shaft including a cable drum and a first gear secured thereto for rotation in unison therewith about a first axis, a housing having a pair of walls spaced from one another in the direction of said first axis, bearing means rotatably supporting said first shaft intermediate said cable drum and first gear in one wall of said housing for rotation on said first axis, said first gear being disposed in said housing and said drum being disposed outside said housing, a second gear in mesh with said first gear and rotatably supported in said housing for rotation about a second axis parallel to said first axis, a brake for said second gear disposed between the other of said walls and said first gear and including a brake drum on said second gear having a portion thereof in radially overlapping relation to said first gear, an input shaft, means rotatably supporting said input shaft relative to said housing, and drive establishing means between said input shaft and said second gear for selectively establishing and interrupting power transmission between said input shaft and said second gear.

12. The structure set forth in claim 11 wherein said drive establishing means includes epicyclic gearing interconnecting said input shaft and second gear and said epicyclic gearing is disposed between said brake drum and said other wall in radially overlapping relation to said first gear.

13. The structure set forth in claim 12 wherein said epicyclic gearing includes a sun element connected for rotation with said input shaft and a planet carrier element connected for rotation with said second gear.

14. A cable control unit comprising: a first rotating shaft including a cable drum and a first gear secured thereto for rotation in unison therewith about a first axis, a housing having a pair of walls spaced from one another in the direction of said first axis, lubricating fluid in said housing, a pair of axially spaced bearings rotatably supporting said first shaft in one wall of said housing for rotation on said first axis, said first gear being disposed within said housing and said drum being disposed outside said housing, passage means between said bearings and the interior of said housing for supplying said fluid to said bearings, a second gear in mesh with said first gear and rotatably supported in said housing for rotation about a second axis parallel to said first axis, a brake for preventing rotation of said second gear disposed between the other of said walls and said first gear including a drum on said second gear having a portion thereof in radially overlapping relation to said first gear, an input shaft, means rotatably supporting said input shaft relative to said housing, and means for establishing and interrupting power transmission between said input shaft and said second gear.

References Cited in the file of this patent

UNITED STATES PATENTS

| | | |
|---|---|---|
| 1,786,917 | Oehmichen | Dec. 30, 1930 |
| 1,940,810 | Osgood | Dec. 26, 1933 |
| 2,098,308 | Ramsey | Nov. 9, 1937 |
| 2,199,668 | Lawler | May 7, 1940 |
| 2,242,193 | Lawler | May 13, 1941 |
| 2,332,862 | Tourneau | Oct. 26, 1943 |
| 2,872,130 | Nardone | Feb. 3, 1959 |